(12) United States Patent
Spahr et al.

(10) Patent No.: US 9,182,016 B2
(45) Date of Patent: Nov. 10, 2015

(54) DRIVE HUB

(75) Inventors: Stefan Spahr, Lengnau (CH); Martin Walthert, Aarberg (CH)

(73) Assignee: DT Swiss Inc., Grand Junction, CO (US)

( * ) Notice: Subject to any disclaimer, the term of this patent is extended or adjusted under 35 U.S.C. 154(b) by 353 days.

(21) Appl. No.: 13/595,286

(22) Filed: Aug. 27, 2012

(65) Prior Publication Data

US 2013/0225343 A1  Aug. 29, 2013

(30) Foreign Application Priority Data

Aug. 26, 2011  (DE) .................. 10 2011 111 277

(51) Int. Cl.
| | |
|---|---|
| F16H 55/12 | (2006.01) |
| F16H 55/30 | (2006.01) |
| F16H 9/06 | (2006.01) |
| B62M 9/10 | (2006.01) |
| B60B 27/02 | (2006.01) |
| B60B 27/04 | (2006.01) |

(52) U.S. Cl.
CPC ................ *F16H 9/06* (2013.01); *B60B 27/023* (2013.01); *B60B 27/04* (2013.01); *B62M 9/10* (2013.01); *B60B 2900/111* (2013.01); *B60B 2900/114* (2013.01)

(58) Field of Classification Search
CPC ......... B62M 9/10; B62M 9/105; F16H 55/30; F16H 7/06; F16D 41/30
USPC ........................................................ 474/160
See application file for complete search history.

(56) References Cited

U.S. PATENT DOCUMENTS

| | | | | |
|---|---|---|---|---|
| 782,262 | A | * | 2/1905 | Morse .............................. 474/79 |
| 3,835,729 | A | * | 9/1974 | Tarutani ........................ 474/144 |
| 4,044,621 | A | * | 8/1977 | McGregor et al. ............ 474/144 |
| 4,380,445 | A | * | 4/1983 | Shimano ....................... 474/144 |
| 4,439,172 | A | * | 3/1984 | Segawa ......................... 474/160 |
| 4,472,163 | A | * | 9/1984 | Bottini .......................... 474/160 |
| 4,580,670 | A | * | 4/1986 | Nagano ........................... 192/64 |
| 5,194,051 | A | * | 3/1993 | Nagano ......................... 474/160 |
| 5,460,254 | A | * | 10/1995 | Huang ............................ 192/64 |
| 5,503,600 | A | * | 4/1996 | Berecz .......................... 474/160 |
| 5,515,957 | A | * | 5/1996 | McConaghy ................... 192/64 |
| 6,059,305 | A | * | 5/2000 | Bollini ....................... 280/281.1 |
| 6,065,580 | A | * | 5/2000 | Kirk .......................... 192/217.3 |
| 6,428,437 | B1 | * | 8/2002 | Schlanger ..................... 474/160 |
| 6,478,128 | B2 | * | 11/2002 | Taylor ............................ 192/64 |
| 6,523,659 | B2 | * | 2/2003 | Kanehisa et al. ............... 192/64 |
| 7,118,505 | B2 | * | 10/2006 | Lee ............................... 474/160 |
| 7,959,529 | B2 | * | 6/2011 | Braedt .......................... 474/160 |
| 8,197,371 | B2 |   | 6/2012 | D'Alusio |
| 8,342,994 | B2 | * | 1/2013 | Braedt .......................... 474/164 |
| 8,663,044 | B2 | * | 3/2014 | Lin ............................... 474/160 |

(Continued)

FOREIGN PATENT DOCUMENTS

DE    102009006101.0    7/2009

*Primary Examiner* — Henry Liu
(74) *Attorney, Agent, or Firm* — Greer, Burns & Crain, Ltd.

(57) ABSTRACT

A drive hub for two-wheeled vehicles with a hub body and with a fixed axle and with a sprocket carrier on which a plurality of sprockets is provided. The sprocket carrier is rotatably supported on the axle by way of at least one bearing. The sprocket carrier includes a circumferentially closed sleeve device on which at least one sprocket is disposed radially outwardly and on which two axially spaced bearings are provided radially inwardly for rotatably supporting the sprocket carrier on the axle via the bearings.

10 Claims, 5 Drawing Sheets

(56) References Cited

U.S. PATENT DOCUMENTS

| | | | |
|---|---|---|---|
| 2002/0072446 A1* | 6/2002 | kanehisa et al. | 475/269 |
| 2003/0171180 A1* | 9/2003 | Shahana et al. | 474/152 |
| 2005/0090349 A1* | 4/2005 | Lee | 474/160 |
| 2006/0063624 A1* | 3/2006 | Voss | 474/78 |
| 2006/0231366 A1* | 10/2006 | Meggiolan | 192/64 |
| 2007/0089960 A1* | 4/2007 | Kanehisa | 192/64 |
| 2008/0017471 A1* | 1/2008 | Kanehisa | 192/64 |
| 2008/0058144 A1* | 3/2008 | Oseto et al. | 474/160 |
| 2008/0083595 A1* | 4/2008 | Spiegel et al. | 192/43.1 |
| 2008/0188336 A1* | 8/2008 | Tokuyama | 474/160 |
| 2008/0234082 A1* | 9/2008 | Braedt | 474/116 |
| 2009/0042682 A1* | 2/2009 | Dal Pra' et al. | 474/160 |
| 2009/0243250 A1* | 10/2009 | Chiang | 280/260 |
| 2010/0009794 A1* | 1/2010 | Chiang | 474/160 |
| 2010/0075791 A1* | 3/2010 | Braedt | 474/160 |
| 2010/0099530 A1* | 4/2010 | Chiang et al. | 474/160 |
| 2010/0252389 A1* | 10/2010 | French | 192/64 |
| 2011/0168513 A1* | 7/2011 | Filipe | 192/64 |
| 2012/0244976 A1* | 9/2012 | Lin | 474/160 |

\* cited by examiner

Fig. 3

Fig. 4 ously supported immediately on the axle by a pair of axially spaced

DRIVE HUB

BACKGROUND

The present invention relates to a drive hub for at least partially muscle-powered vehicles and in particular two-wheeled vehicles with an axle and with a hub body is provided rotatably around it and with a sprocket carrier for transmitting the driving force to the drive hub.

Different drive hubs for muscle-powered vehicles such as bicycles have become known in the prior art. Bicycles in the field of sports and for professionals tend to be provided with a gear shift device. Other than transmission hubs, chain shifting devices are in particular employed where a sprocket cluster having multiple drive sprockets is provided the sprockets of which can be selectively actuated to change transmission ratios as desired. Chain shifting devices are advantageous since they show high efficiency and ease of maintenance since each of the sprockets and the chain are accessible from the outside.

These days, so-called cassette hubs tend to be employed in which a rotor is received rotatably relative to the hub axle and which is non-round in its outer contour. A sprocket cluster having a non-round inner contour is pushed onto the non-round outer contour such that the sprocket cluster with its different sprockets is non-rotatably received at the rotor. The sprocket cluster consists of a sprocket carrier and the sprockets disposed thereon.

These known drive hubs operate reliably and allow simple and quick exchange of the sprocket clusters since the sprocket carrier with all the sprockets is provided for simple exchange. Since each sprocket is subjected to wear, this enables an effective exchange of individual or all of the sprockets.

The drawback of these known hubs is the high space requirement. The drive hub rotor must have a certain outer diameter for receiving the bearings to support the rotor. This in turn requires a certain minimum diameter and a not inconsiderable weight. The inner hub diameter is specified though since the axle needs to be compatible with the usual standards. For example through axles are 12 mm in diameter.

With DE 10 2009 006 101 A1 a hub arrangement has become known having a hub body, a fixed axle and a conical set of sprockets arranged rotatably relative to the fixed axle. The extreme end of the set of sprockets is provided with a bearing by way of which the set of sprockets is supported on the fixed axle. With its other end the set of sprockets radially surrounds the hub body. To facilitate rotation the exterior of the hub body may be provided with a bushing which serves as a gliding bushing, reducing friction between the set of sprockets and the hub body. Basically this hub arrangement allows the achievement of low weight. The drawback is, however, that the set of sprockets, which must transfer the entire driving energy to the hub body, is supported on one bearing only. The bushing provided at the other end is wholly exposed to environmental influences, forming a potential weak point. Although one might provide instead of the bushing, a roller bearing, it would considerably increase the weight given the large diameter, and it would again have to be protected from dirt and moisture.

SUMMARY

Against the described prior art it is therefore the object of the present invention to provide a drive hub which is simple in structure and allows a low weight with reliable functionality.

A drive hub according to the invention is provided to be employed in at least partially muscle-powered vehicles and in particular two-wheeled vehicles. Particularly preferably the drive hub according to the invention is employed in bicycles or electro-assisted bicycles. The drive hub according to the invention comprises a hub body provided rotatably relative to a fixed axle. Furthermore at least one sprocket carrier is provided. The sprocket carrier is rotatably supported relative to the fixed axle. The sprocket carrier is provided with a plurality of sprockets. The sprocket carrier comprises a circumferentially closed sleeve device at the exterior of which at least one sprocket is disposed and at the radial inside of which two axially spaced bearings are provided for rotatably supporting the sprocket carrier on the fixed axle.

The drive hub according to the invention has considerable advantages since it combines a simple structure with high functionality. The fact that the sprocket carrier is rotatably supported immediately on the axle by a pair of axially spaced bearings allows considerable saving of weight. A separate rotor is not required. Moreover the structure is simpler while reliable function is concurrently ensured. The circumferentially closed sleeve device protects the bearings from dust and moisture so as to enable a permanently reliable operation. The support of the sleeve device and thus of the sprocket carrier is only provided relative to the axle. A sliding bearing at the hub body is not required.

The sprocket carrier of the present invention combines in a simple and permanently reliable way the rotor employed thus far with the sprocket carrier provided thereon in particular in one component. This allows simplified construction since the sprocket carrier is immediately supported on the axle via bearings. Unlike in the cited prior art the bearings of the sprocket carrier are disposed inside the sleeve device protected from environmental influences. The sprocket carrier bearings can, due to their axial distance, dissipate bending moments to the axle. A bearing relative to the hub sleeve or the hub body is not required.

The sleeve device comprises a circumferentially closed axial sleeve at which a frusto-conical sprocket holder is disposed. The frusto-conical sprocket holder may be configured integrally with the axial sleeve or as a separate part which is connected with the axial sleeve.

One end of the frusto-conical sprocket holder is preferably supported at, or formed by, one end of the sleeve device. Preferably the other end of the frusto-conical sprocket holder is supported at the sleeve device via webs or a circumferential supporting wall. The frusto-conical sprocket holder may be formed by one end of the sleeve device.

In all the configurations it is preferred for the sleeve device to axially enter the hub body.

Preferably the sleeve device is sealed via at least one sealing device to largely prevent dust and/or moisture from penetrating into the interior of the sleeve device. In this way the bearings accommodated within the sleeve device are still better protected from environmental influences.

The interior of the hub body is in particular sealed by at least one sealing device to largely prevent dust and/or moisture from penetrating into the interior.

Preferably at least one sealing device is configured as a contactless seal in the shape of e.g. a gap seal and/or at least as a labyrinth seal. Also possible and preferred is at least one contacting sealing device such as at least one elastomeric seal.

Preferably at least one sealing device is provided between the hub body and the sleeve device. Sealing between the hub body and the sleeve device automatically also seals the interior of the sleeve device and the interior of the hub body.

Preferably at least one sealing device is provided for sealing the sleeve device at the axle axially outwardly. Such a sealing device may e.g. be provided at an adapter ring or axle adapter by means of which the hub can be accommodated on a frame. Such an adapter ring may be provided to be pushed onto the axle. It is also possible for the adapter ring to be inserted into the axle.

In preferred specific embodiments the sprocket carrier comprises at least one sprocket and in particular a plurality of sprockets.

At least one sprocket is preferably configured one-piece with the sprocket carrier. In particular at least one sprocket is provided integrally with the sprocket carrier. This means that the rotor can be saved and that the sprocket carrier with the sprockets disposed thereat is presently configured as one joined component.

This allows a savings of a considerable proportion of the weight. Moreover the structure becomes simple. In a concrete example the total weight of hub, sprocket carrier and sprockets has been reduced by more than 5%.

Preferably a plurality of sprockets is configured one-piece with the sprocket carrier. Particularly preferably one sprocket is disposed exchangeable at the sprocket carrier. In particular two, three or several sprockets can be provided at the sprocket carrier exchangeable singly or together.

Particularly preferably at least the sprocket having the smallest number of teeth is disposed exchangeable at the sprocket carrier. This allows exchanging the sprocket which usually shows the worst wear. The sprocket having the smallest number of teeth is frequently used in daily operation and shows the highest wear per tooth due to the smallest number of teeth. If this sprocket or multiple sprockets having small numbers of teeth are provided exchangeable, a long service life of the entire sprocket carrier can thus be enabled. The sprockets fixedly configured at the sprocket carrier are selected such that they are subjected to less wear such that these sprockets will show approximately even wear.

The sprockets formed integrally with the sprocket carrier and the additional sprockets provided exchangeable at the sprocket carrier ensure a long service life of the component since the sprockets most subjected to loads can be provided to be exchangeable.

Preferably the sprocket carrier consists of a metal and in particular a light metal or a light metal alloy. Additionally the sprockets configured one-piece therewith may comprise coating of a hard material such as a hard metal or ceramics or the like to increase their service life. The sprockets provided exchangeable may likewise consist of a metal and in particular a light metal; however they may consist, and/or comprise a coating, of a hard metal or steel. Composite materials and in particular fibrous composite materials are likewise conceivable.

In particularly preferred configurations a freewheel is provided comprising at least one freewheel component having an axial toothing.

Particularly preferably the sprocket carrier and in particular the sleeve device is provided with one of the at least one axial toothings such that a freewheel component is configured at the sprocket carrier or by the sprocket carrier or the sleeve device itself.

This configuration is particularly advantageous since it allows a compact, functional structure of the drive hub according to the invention.

It is possible for the sprocket carrier to be provided with a separate toothed disk having the axial toothing. Then the toothed disk in particular consists of a metal and in particular steel or the like or it is coated with a hard material.

The freewheel preferably comprises a second toothed disk which is in particular provided or received at the hub body.

At least one toothed disk is preferably floatingly supported such that it can compensate at least small angular differences.

It is also possible for both the toothed disks to be floatingly supported. To this end the sprocket carrier and in particular the sleeve device is then provided with a separate toothed disk having an axial toothing interacting with the toothed disk received or provided at the hub body for transmitting the drive torque to the hub body.

When the rider is not pedaling or for example pedaling backwardly, the pair of toothed disks or axial toothings is axially urged away from one another such that the freewheeling function comes into force.

In particularly preferred configurations at least one sprocket carrier includes a number of sprockets of seven to ten and in particular of seven to nine. The fact that the sprocket carrier is supported on the axle immediately via bearings leads to the further advantage that the outer diameter of the smallest sprocket can be reduced. This allows a reduction in the number of teeth. Unlike in the prior art where the sprocket cluster must be pushed onto the rotor, the sprocket carrier may presently have a considerably smaller outer diameter in the place of the smallest sprocket so as to allow a smaller number of teeth of the smallest sprocket. In this way weight is saved again. Moreover it is possible to reduce the number of teeth of the chainwheel to obtain the same previous transmission ratio. This allows a reduction in the outer diameter of the chainwheel in the front at the bottom bracket which results in saving weight once again.

In preferred configurations the sprocket carrier may comprise a sleeve device configured as an axial sleeve and a frusto-conical sprocket holder. The axial sleeve and the frusto-conical sprocket holder may be provided integral.

In another configuration a drive hub for at least partially muscle-powered vehicles and in particular two-wheeled vehicles comprises a hub body and an axle and a sprocket carrier. The sprocket carrier with at least one sprocket is configured integrally with the rotor.

In this way a separate component is saved in which way reliable function with little expenditure is enabled.

Preferably the sprocket carrier can be exchanged by a rotor at which a toothed gear cassette having several sprockets can be disposed and in particular fixed non-rotatably. In particular commercially available and/or standardized and/or conventional toothed gear cassettes may be disposed at such a rotor. This is another considerable advantage of the invention. The dimensions are selected such that a rotor with a standard toothed gear cassette can be disposed instead of the sprocket carrier as required. Moreover, different hubs require stocking only a few components.

BRIEF DESCRIPTION OF THE DRAWINGS

Further advantages and features of the present invention can be taken from the exemplary embodiments which will be discussed below with reference to the enclosed figures.

These show in:

FIG. 3 a first drive hub according to the invention for a bicycle according to FIG. 1 or 2;

FIG. 4 a second drive hub according to the invention for a bicycle according to FIG. 1 or 2;

DETAILED DESCRIPTION

Figure 1:
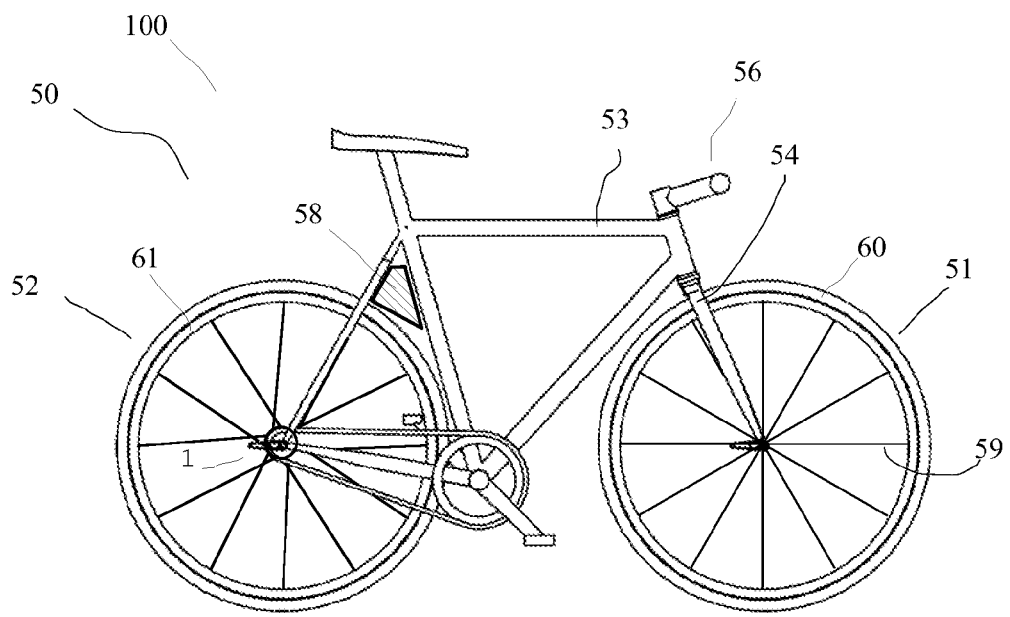
FIG. 1 a first bicycle with a drive hub according to the invention in a side view.

In FIG. 1 a vehicle 70 configured as a two-wheeled vehicle 50 and in particular as a racing bicycle is illustrated in a schematic side view. The bicycle 50 is muscle-powered at least in part and may be provided with an electric auxiliary drive.

The racing bicycle is illustrated in a simplistic side view and comprises a front wheel 51 and a rear wheel 52 and a frame 53. A handlebar 56 serves as a control and may have different configurations.

Beneath the saddle 57 a battery 58 may be provided which is employed in particular for electro-assisted two-wheeled vehicles. Generally speaking, such a battery 58 may be attached to the frame in other places or incorporated into the frame or attached elsewhere.

In the bicycle according to FIG. 1 the tire 60 may be configured as a tubeless tire and for example be glued onto the rim 61. The rims 61 of the front wheel 51 and the rear wheel 52 are each connected with the hub via spokes 27.

The rear wheel 52 is provided with a drive hub 1 according to the invention as the rear wheel hub 3 while the front wheel comprises with [sic; translator's note] a front wheel hub 4.

Figure 2:
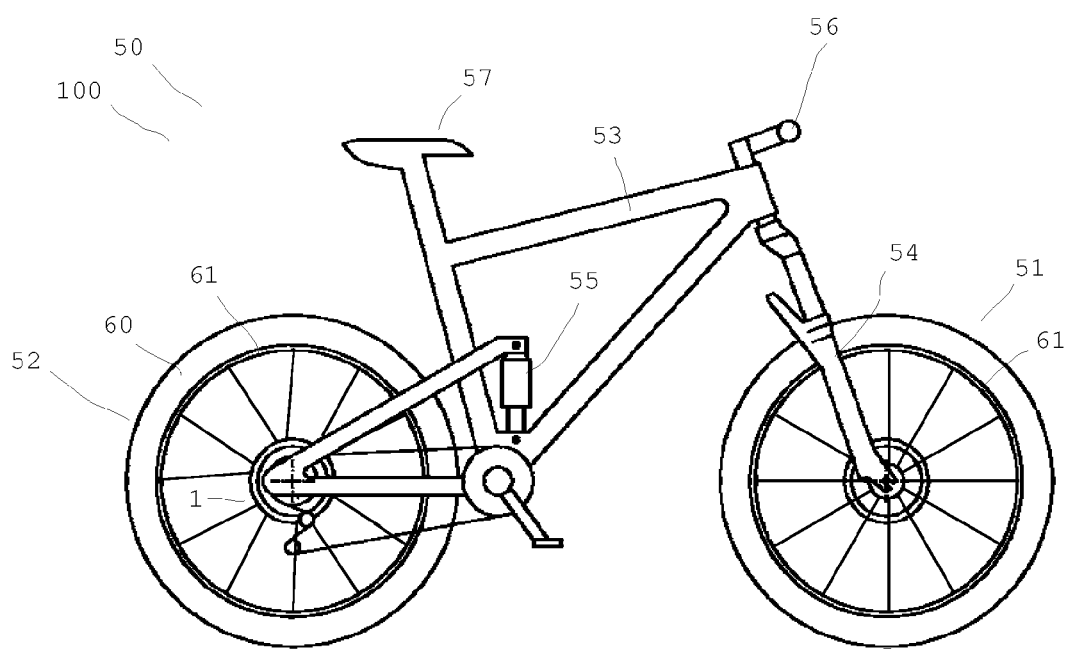
FIG. 2 a mountain bike with a drive hub according to the invention in a side view.

In FIG. 2 a mountain bike bicycle 50 is illustrated in a simplistic side view comprising a front wheel 51 and a rear wheel 52, a frame 53, a sprung front fork 54 and a rear wheel damper 54. In this exemplary embodiment, disk brakes are provided. The rear wheel 52 is provided with a drive hub 3 according to the invention as the rear wheel hub and the front wheel 51 is provided with a front wheel hub 4.

Figures 3, 4:
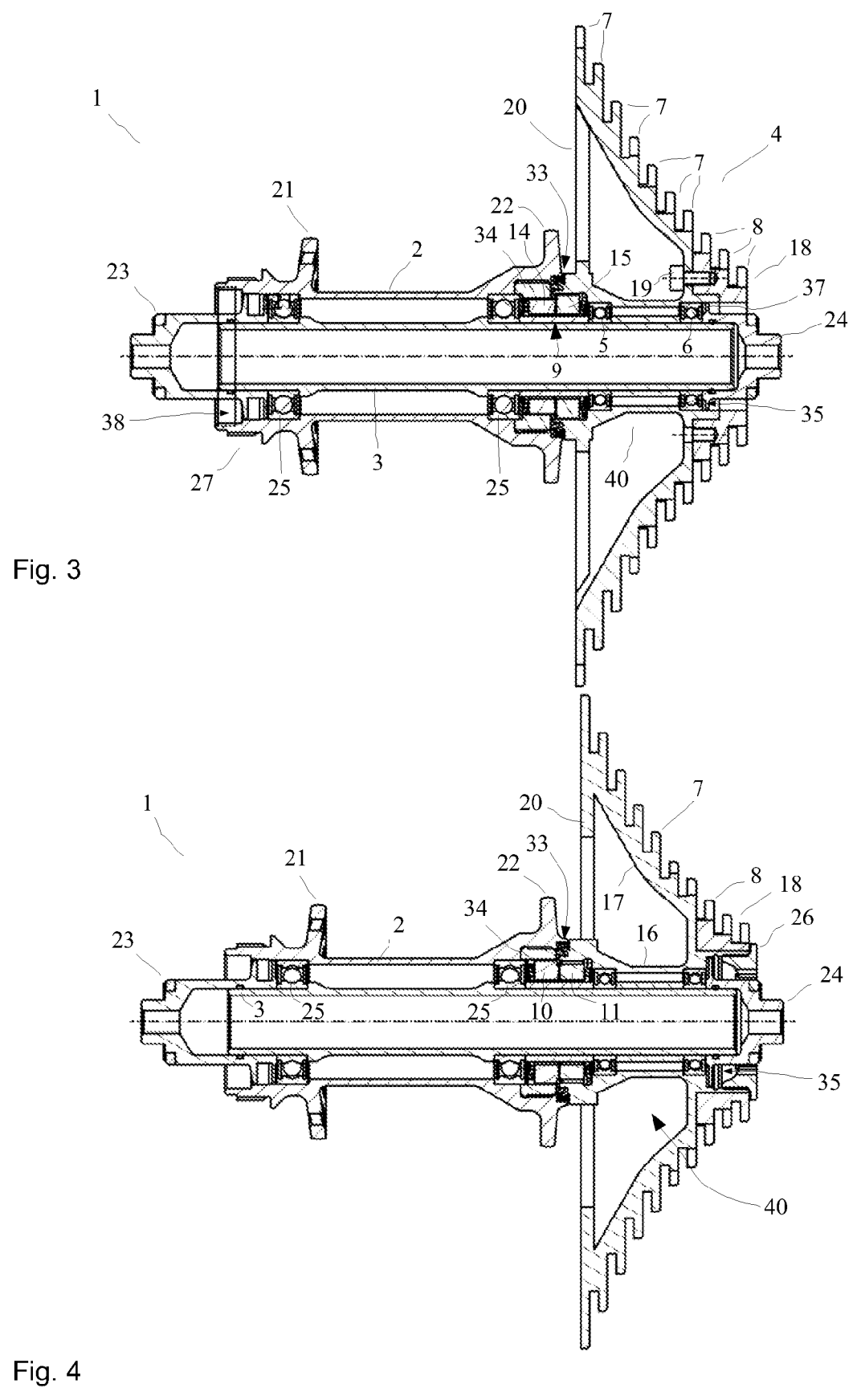

FIG. 3 shows a cross-section of a drive hub 1 according to the invention for a bicycle 50 according to FIG. 1 or 2.

The drive hub 1 according to the invention is provided with a fixed hub axle 3 presently configured hollow and a hub body 2 presently configured one-piece for fastening the spokes. The hub body 2 presently comprises two hub flanges 21 and 22 for fastening the spokes. In other configurations the hub body 2 may be configured multipart and for example be provided with a hub sleeve and separate hub flanges 21 and 22 fastened thereto. The hub flanges 21 and 22 may be configured to be employed with straight-pull spokes.

The hub body 2 is supported rotatable relative to the hub axle 3 via two presently identical bearings 25.

The sprocket carrier 4 is formed by a sleeve device 40 circumferentially wholly closed along its length, and a hollow, frusto-conical sprocket holder 17. The axial sleeve 16 is circumferentially closed such that any environmental influences can only penetrate into the interior at the ends of the axial sleeve 16. In this way the bearings 5 and 6 are already accommodated largely protected. Additionally, sealing devices are provided for sealing.

A freewheel 9 with two freewheel components 10 and 11 is provided for transmitting driving force in the driving direction from one of the sprockets 7, 8 through the sprocket carrier 4 to the hub body 2. When the user is not pedaling or else pedaling backwardly the coupling of the sprocket carrier 4 with the hub body 2 is lifted and the freewheel is transferred to the freewheeling position.

The freewheel 9 presently comprises the toothed disks 14 and 15, which are provided with axial toothings 12 and 13. The toothed disk 14 is axially displaceably and non-rotatably received in the hub body 2 while the toothed disk 15 is presently axially displaceably and non-rotatably received in the sleeve device 40 of the sprocket carrier 4. The two toothed disks 14 and 15 are each biased axially toward one another to the engagement position illustrated in FIG. 3 by biasing means configured as coil springs. A sealing device 33 is provided radially outwardly which may comprise a labyrinth seal having a sealing lip 36 and/or a contacting elastomeric seal to protect the freewheel and the interior of the drive hub 1 from entry of humidity and/or dirt.

The sprocket carrier is presently worked substantially integrally and comprises a sleeve device 40 with an axial sleeve 16 and a hollow, frusto-conical sprocket holder 17 at which presently seven sprockets 7 are configured while three further sprockets 8 are provided at an exchangeable sprocket assembly 18. The sprocket assembly 18 is fastened on the inner hollow face of the frusto-conical sprocket holder by means of screws 19. For fastening, two, three or more screws 19 evenly or unevenly distributed over the circumference may be provided.

The toothed disk 14 and likewise the toothed disk 15 presently comprises a non-round outer contour which is configured for example in the shape of a radial toothing. The radial toothing of the toothed disk 14 is non-rotatably and axially displaceably guided in a corresponding radially inwardly toothing of the threaded ring 34. The threaded ring 34 may instead of an external thread be provided with a non-round outer contour which is non-rotatably inserted in a corresponding, non-round inner contour of the hub body. Axial fastening may occur via a separate component. The threaded ring 34 preferably consists of a strong material and in particular steel, and it may be exchanged as needed or in the case of wear.

The toothed disk 15 with its non-round outer contour in the shape of a radial toothing is again non-rotatably and axially displaceably guided in a corresponding radially inwardly toothing of the sleeve device 40. To this end a threaded ring may be provided in the sleeve device 40 in analogy to the threaded ring 34. Also, the sleeve device 40 may comprise a non-round inner contour for non-rotatable and axially displaceable accommodation of the toothed disk 15.

The drive hub 1 according to FIG. 3 is provided with a pair of axle adapters or adapter rings 23 and 24 each at one end of the drive hub. The adapter rings 23 and 24 fix the hub each in the axial direction, retaining the sprocket carrier 4 on the hub.

Each of the adapter rings is provided with a sealing device to protect the interior of the hub from dust, dirt and/or moisture.

The adapter ring 24 comprises a sealing device 35 with a sealing flange 37 extending from the adapter ring 24 radially outwardly. The remaining gap between the sealing flange 37 of the adapter ring 24 and the cylindrical interior of the axial sleeve 16 of the sleeve device 40 is small enough to largely prevent dirt and the like from entering. In this way the adjacent bearing 6 within the sleeve device 40 is reliably protected from environmental influences.

The sleeve device 40 extends with one end 41 into a recess of the hub body 2.

The adapter ring 23 is again provided with a sealing device. The sealing device 38 comprises a pair of axially spaced sealing devices forming kind of a labyrinth seal. The sealing device 38 protects the interior of the hub body 2 from dirt and dust.

Between the hub body 2 and the sprocket carrier 4 a sealing device 33 is provided which may comprise a contacting and/ or a contactless seal. A sealing lip 36 is for example provided. The sealing lip 36 consisting in particular of a strong material generates a narrow sealing gap together with the hub body 2.

By means of the sealing device 33 the interior of the sleeve device 40 is protected from environmental influences. The bearings 5 and 6 of the sprocket carrier 4 and also the freewheel 9 are largely protected from dirt, dust, and moisture. This promotes reliable operation.

A considerable advantage of the invention also consists in that the sprocket carrier 4 is supported directly on the axle 3 via the bearings 5 and 6 and that no separate component in-between is required for disposing the individual sprockets 7, 8. This allows saving a considerable proportion of weight while a very compact structure but still reliable operation is simultaneously possible.

While the sprockets 7 with the larger numbers of teeth are presently configured one-piece with the sprocket carrier 4, the sprocket assembly 18 with the presently three sprockets 8 is provided at the sprocket carrier to be exchangeable in its entirety as a common assembly. The three sprockets 8 are subjected to the highest wear since their numbers of teeth are the smallest. The sprockets 8 can be exchanged as needed, singly or altogether as a sprocket assembly 18. The larger sprockets 7 are all subjected to an approximately comparable wear which is lower than wear to the sprockets 8. In this way a long service life is allowed on the whole.

FIG. 4 shows another exemplary embodiment of a drive hub 1 according to the invention which is again provided with a hollow axle 3 and a hub body 2. A freewheel 9 with freewheel components 10 and 11 is provided with the freewheel components 10 and 11 comprising toothed disks 14 and 15.

The sprocket carrier 4 is again provided with a plurality of sprockets 7, 8. On the whole, ten sprockets are again provided, the three smallest sprockets 8 of which being disposed at a common sprocket assembly 18. The sprocket assembly 18 is disposed to be exchangeable. Presently the sprocket assembly 18 is screwed onto the end of the sprocket carrier 4. It is also possible for the sprocket assembly 18 to be pushed on and fixed by a separate fixing ring 26 which is for example screwed into the inner end of the sprocket carrier 4.

As in the exemplary embodiment according to FIG. 3, the exemplary embodiment according to FIG. 4 is again provided with ridges 20 extending outwardly in a radial or at least partially radial way to reinforce the sprocket carrier 4 or to support the sprockets 7, 8 from the inside.

Figure 5:
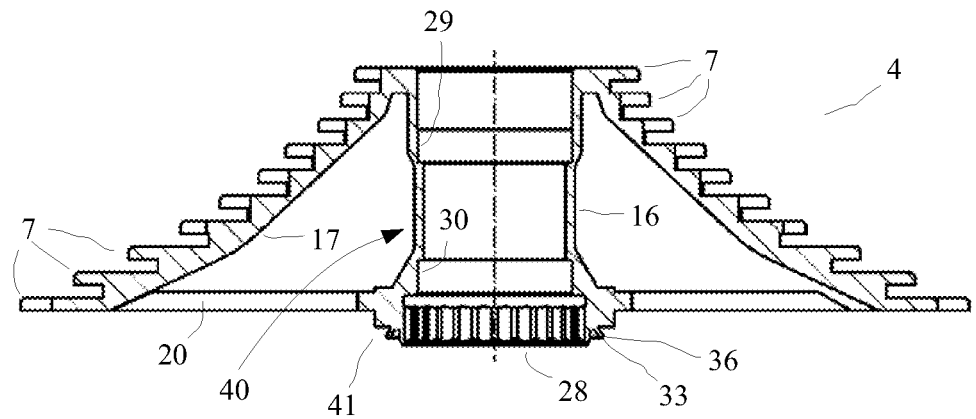
FIG. 5 a first drive carrier in a sectional view.

FIG. 5 shows a sprocket carrier in section. The sprocket carrier 4 manufactured on the whole integrally presently again comprises a total of ten sprockets 7, all of which in this configuration are manufactured one-piece with the sprocket carrier 4. Radial reinforcement ridges 20 are provided for connecting the axial sleeve 16 with the frusto-conical and hollow sprocket holder 17. In the interior of the axial sleeve 16 bearing seats 29 and 30 are provided to receive the bearings 5 and 6. The bearing seats comprise axial stoppers for fixing the bearings 5 and 6 in the axial direction.

One of the ends is provided with a toothed disk accommodation 28. The toothed disk accommodation 28 is provided with a non-round inner contour which is presently configured as an internal toothing and which serves to receive a toothed disk firmly but axially displaceably.

The toothed disk 15 non-rotatably connected with the sprocket carrier 4 serves as freewheel component 11 and interacts with the freewheel component 10 for example of the drive hub 1 from FIG. 4.

Figure 6:
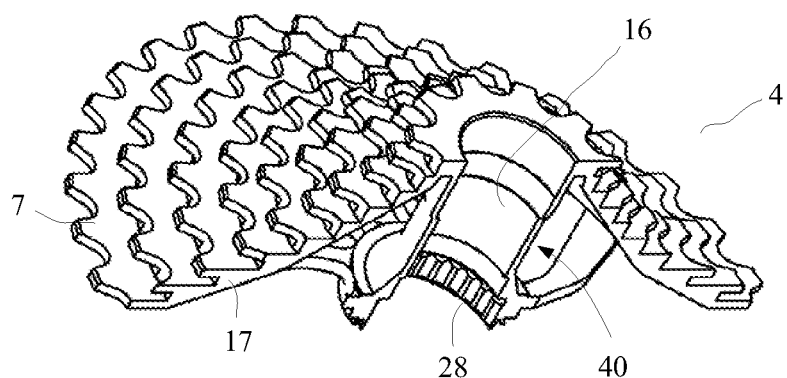
FIG. 6 the drive carrier of FIG. 5 in a perspective, sectional view.
Figure 7:
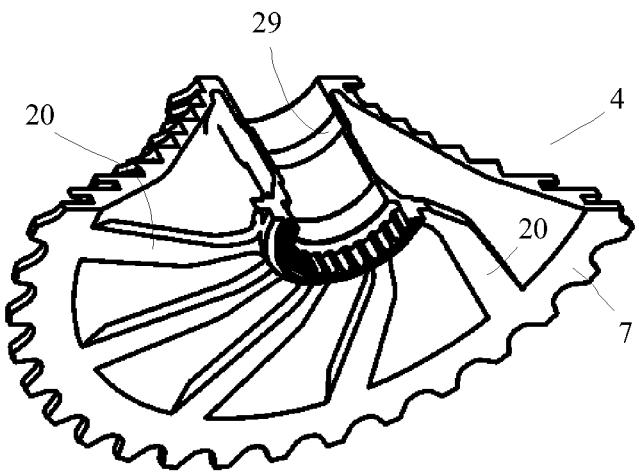
FIG. 7 the drive carrier according to FIG. 5 in another perspective, sectional view.

FIGS. 6 and 7 show sectional perspective views of the two sides of the sprocket carrier 4 wherein it becomes clear that the ridges 20 other than a radial, also comprise a circumferential component.

Figure 8:
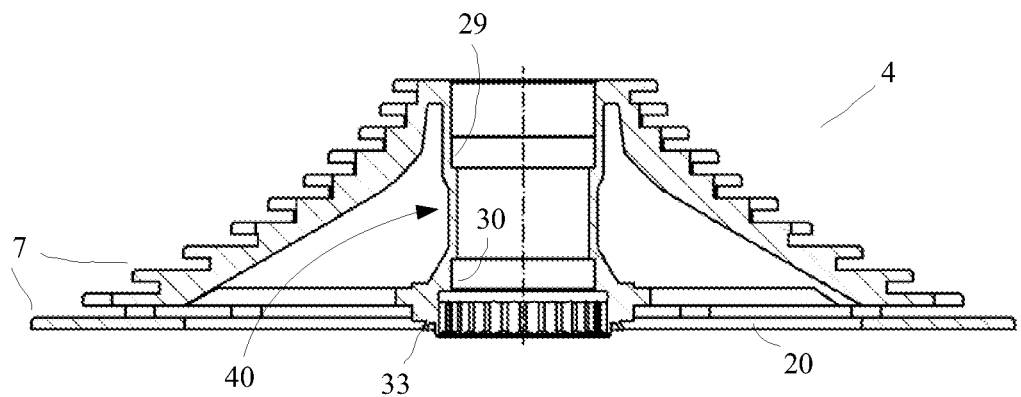
FIG. 8 another drive carrier in section.

FIG. 8 shows another cross-section of a sprocket carrier 4 which is presently configured for an assembly of eleven sprockets 7 all of which in this exemplary embodiment are configured one-piece with the sprocket carrier 4. In the interior of the sprocket carrier 4, bearing seats 29 and 30 and a toothed disk accommodation 28 are again provided. Such a sprocket carrier 4 is formed integrally with the sprockets 7 and enables a particularly low weight. The service life can be increased by coating the individual sprockets 7.

Figure 9:
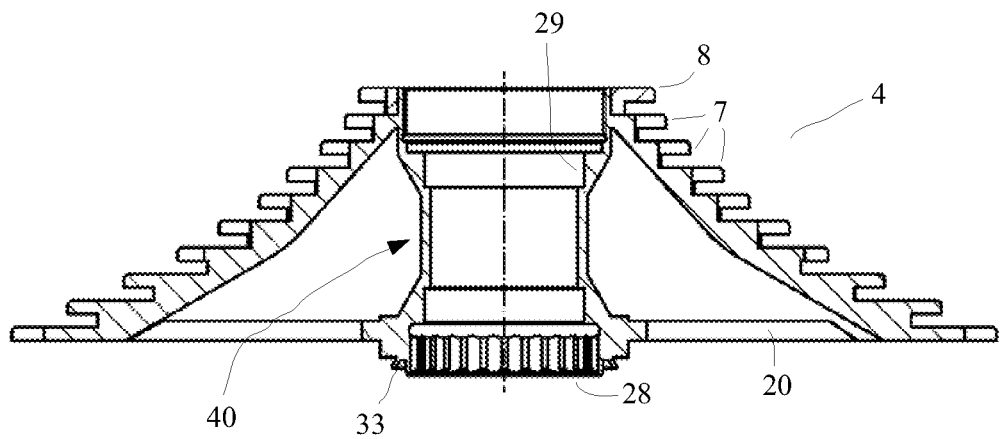
FIG. 9 still another drive carrier in section.

FIG. 9 shows a cross-section of a sprocket carrier 4 in which presently only the smallest sprocket 8 is provided exchangeable. The sprocket 8 may be screwed or pushed onto the sprocket carrier 4 or fastened therewith in another way.

A seal 33 in the form of a labyrinth seal and/or an elastomeric seal may be provided for sealing the interior of the drive hub and in particular of the freewheel 9 of a drive hub 1.

Figure 10:
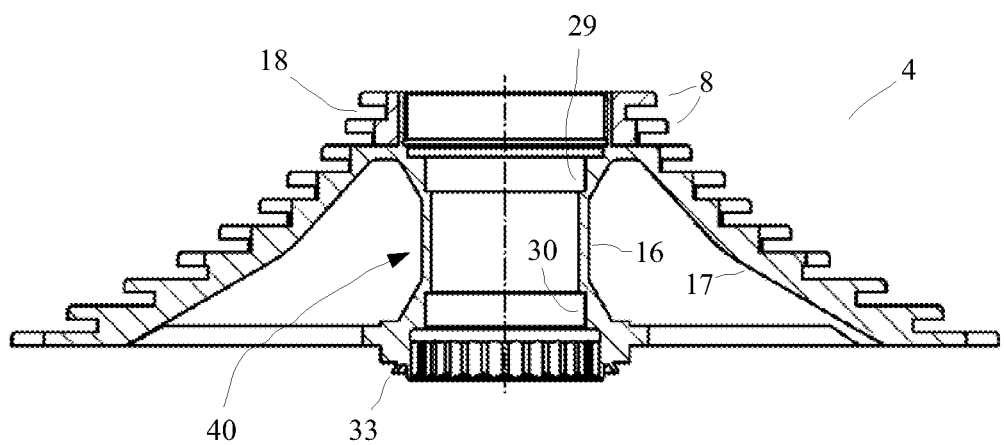
FIG. 10 a fourth drive carrier in section.

The cross-section of a sprocket carrier 4 illustrated in FIG. 10 is again provided with an axial sleeve 16 which is configured integrally with a hollow, frusto-conical sprocket holder 17. In this configuration two sprockets 8 are provided as part of a sprocket assembly 18 to be exchangeable at the sprocket carrier 4. This allows simple exchange of the sprockets 8 showing the highest wear. The sprocket assembly 18 may presently for example also be screwed onto the sprocket carrier 4.

Figure 11:
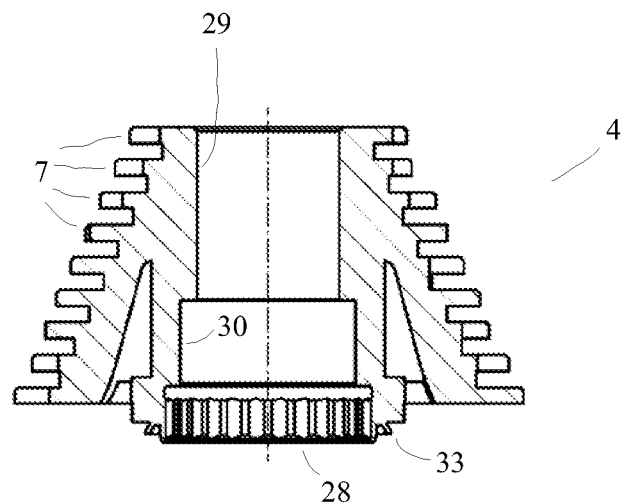
FIG. 11 a fifth drive carrier in section.

FIG. 11 shows a cross-section of a sprocket carrier 4 in which the gradation of the individual sprockets 7 to one another is very small. For example all the adjacent sprockets may only show tooth differences of one or two relative to one another. Such a sprocket carrier is for example suitable for a racing bicycle according to FIG. 1, while sprocket carriers with sprockets having larger differences in the number of teeth are better suitable for mountain bikes or the like.

Figure 12:
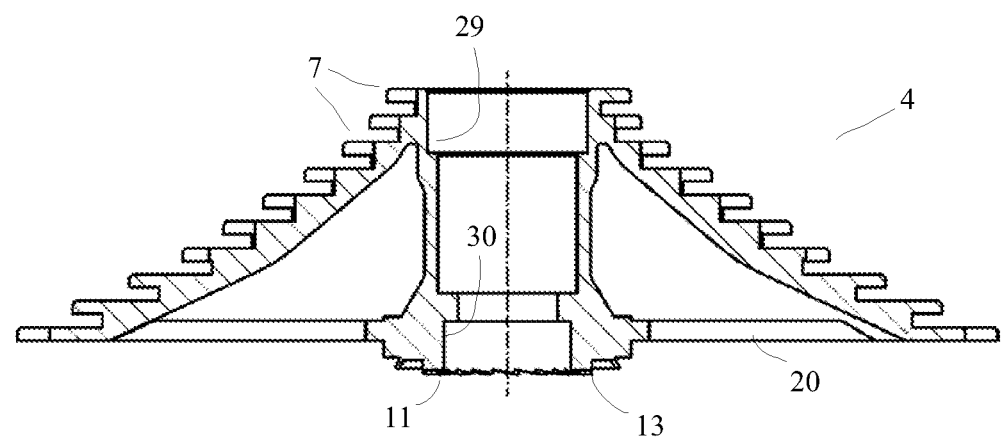
FIG. 12 a sixth drive carrier in section.

FIG. 12 shows a cross-section of a sprocket carrier 4 in which the toothed disk 15 is an integral component of the sprocket carrier 4. The toothed disk 15 as a freewheel component 11 is configured one-piece with the sprocket carrier 4 and is provided with an axial toothing 13 which in interaction of the axial toothing 12 of a toothed disk 14 in the hub body reliably causes the freewheel function. The sprocket carrier may be provided with all or just some of the sprockets firmly incorporated. It is also possible and preferred for one or multiple sprockets to be provided exchangeable separately, singly or as a sprocket assembly, as has been discussed in the previous exemplary embodiments.

On the whole the invention provides an advantageous drive hub which allows a particularly simple structure and considerable saving of weight. In a concrete example, given a total weight of the drive hub and the sprocket cluster of approximately 500 g, saving weight of between approximately 20 g and 200 g was attained. The possible saving of weight very much depends on the weight of the sprocket cluster to be replaced. A weight reduction between 30 g and 100 g can typically be achieved. Given a total weight of a mountain bike of approximately 8 kg, 0.1 kg is considerable, in particular considering that with each component endeavors are made to reduce each single gram of weight.

Due to the smaller basic diameter, smaller sprockets may be provided such that as the smallest sprocket, numbers of teeth of seven to nine teeth are possible. In conventional hubs with a rotor the smallest number of teeth is presently eleven teeth. To obtain the same transmission ratio the chainwheel in front may also become smaller such that still more weight can be saved.

Moreover the hub flange 22 on the side of the sprocket carrier 4 may be pushed axially considerably farther outwardly by up to 2 mm or more so as to positively influence the lateral stiffness of the wheel.

While preferably a plurality of the sprockets are configured one-piece and in particular integrally with the sprocket carrier 4, specific sprockets may be provided to be exchangeable separately. These sprockets may be manufactured of a more resistant material.

In all of the configurations it is preferably possible for the sprocket carrier 4 to be exchanged for a conventional rotor. The rotor may be equipped with different toothed gear cassettes. This allows a still more flexible use of the hub.

The invention claimed is:

1. A drive hub for at least partially muscle-powered vehicles and in particular two-wheeled vehicles, comprising: a hub body, a fixed axle and a sprocket carrier disposed rotatable relative to the fixed axle on which a plurality of sprockets are provided, the sprocket carrier includes a circumferentially closed sleeve device on which at least one sprocket is provided radially outwardly and at which radially inwardly a pair of axially spaced apart bearings are provided to rotatably support the sprocket carrier on the axle, wherein the sleeve device includes a circumferentially closed axial sleeve and a frusto-conical sprocket holder, said sleeve device extending into the hub body, a sealing device positioned between said hub body and said sleeve device, wherein said sealing device seals said sleeve device to prevent dust and/or moisture from penetrating into an interior of said sleeve device, a first end of the frusto-conical sprocket holder is provided at an end of the sleeve device and a second end of the frusto-conical sprocket holder is supported on the sleeve device via webs, wherein a plurality of the sprockets are integrally formed with the sprocket carrier as an integral unit and a plurality of the sprockets are removably attached to the sprocket carrier individually or as a unit and exchangeable with another sprocket or sprockets.

2. The drive hub according to claim 1 wherein said sealing device seals the sleeve device axially outwardly on the axle.

3. The drive hub according to claim 1 wherein a freewheel is provided which comprises at least one freewheel component with an axial toothing.

4. The drive hub according to claim 3 wherein the sprocket carrier comprises one of the at least one axial toothing.

5. The drive hub according to claim 3 wherein the sleeve device is provided with a separate toothed disk with the axial toothing which in particular consists of steel or is coated with a hard material.

6. The drive hub according to claim 1 wherein at least one sprocket comprises a tooth number of 7 to 10 and in particular of 7 to 9.

7. The drive hub according to claim 1 wherein the sprocket carrier consists of a light metal.

8. The drive hub according to claim 1 wherein at least one of said sprockets consists of one of light metal, steel and a hard coating.

9. The drive hub according to claim 1 wherein the sprocket carrier is configured integrally with the sleeve device.

10. The drive hub according to claim 4 wherein the sleeve device is provided with a separate toothed disk with the axial toothing which in particular consists of steel or is coated with a hard material.

* * * * *